United States Patent
Wyschogrod et al.

(10) Patent No.: US 7,461,370 B2
(45) Date of Patent: Dec. 2, 2008

(54) FAST HARDWARE PROCESSING OF REGULAR EXPRESSIONS CONTAINING SUB-EXPRESSIONS

(75) Inventors: Daniel Wyschogrod, Newton, MA (US); Leonid Leibman, Weston, MA (US)

(73) Assignee: SafeNet, Inc., Belcamp, MD (US)

( * ) Notice: Subject to any disclaimer, the term of this patent is extended or adjusted under 35 U.S.C. 154(b) by 561 days.

(21) Appl. No.: 10/359,839

(22) Filed: Feb. 7, 2003

(65) Prior Publication Data
US 2003/0163803 A1 Aug. 28, 2003

Related U.S. Application Data

(60) Provisional application No. 60/359,532, filed on Feb. 25, 2002.

(51) Int. Cl.
*G06F 9/45* (2006.01)
(52) U.S. Cl. .................. 717/144; 717/142; 717/143; 717/154
(58) Field of Classification Search .......... 717/123–150
See application file for complete search history.

(56) References Cited

U.S. PATENT DOCUMENTS

| 6,018,735 A * | 1/2000 | Hunter ........................ 707/5 |
| 6,085,186 A * | 7/2000 | Christianson et al. .......... 707/3 |
| 6,785,677 B1 * | 8/2004 | Fritchman ..................... 707/6 |

* cited by examiner

*Primary Examiner*—Chuck O Kendall
(74) *Attorney, Agent, or Firm*—Drinker, Biddle & Reath LLP

(57) ABSTRACT

A system for processing regular expressions containing one or more sub-expressions. Information regarding one or more regular expressions, each containing one or more sub-expressions, is stored. Data is compared to the stored information regarding expressions in only a single pass through the data. From the comparison, for any stored expression, the location within the data of the beginning and end of each sub-expression, and the end of the regular expression, are determined. From such determination, the presence within the data of any one or more stored regular expressions containing one or more sub-expressions is identified.

10 Claims, 7 Drawing Sheets

FAST HARDWARE PROCESSING OF REGULAR EXPRESSIONS CONTAINING SUB-EXPRESSIONS

CROSS REFERENCE TO RELATED APPLICATION

This application claims priority of Provisional application Ser. No. 60/359,532, filed on Feb. 25, 2002.

FIELD OF THE INVENTION

This invention relates to the processing of regular expressions.

BACKGROUND OF THE INVENTION

A valuable mechanism in dealing with regular expressions involves the use of subexpressions, frequently called 'backreferences'. Traditionally, this was associated with the use of NFAs, which are far slower at execution than DFAs. However subexpressions allow flexibility for the user, not available in a DFA without subexpressions. For example, suppose the digits of an identification code are to be extracted from an HTTP session and that their location is denoted by prefixing with the string 'ID=' and followed by the string 'EndOfSecretID'. Then using conventional regular expression notation: 'ID=<\d+>EndOfSecretID' will match the appropriate portion of a string and return to the user a substring corresponding to the characters of the input that match that part of the regular expression that occurs between the angle brackets. Standard techniques for processing regular expressions containing subexpressions involve 'backtracking' or multiple passes through the data. Note that the notation used in this document differs somewhat from conventional regular expression notations where parenthesis are used to indicate subexpressions. Here, angle brackets <>denote the boundaries of a subexpression, and parenthesis are used for expression grouping.

SUMMARY OF THE INVENTION

The invention allows handling of subexpressions with a single forward pass through the data. Further, the invention allows a simple stack-based implementation to perform the operations related to subexpression handling.

This invention implements subexpressions as a DFA in hardware. Restrictions placed on the types of allowed subexpressions facilitate implementation as a DFA. These restrictions are:

1) Only a fixed number of rules, $N_{rsub}$ can have subexpressions. The remainder of rules cannot.
2) Each of the $N_{rsub}$ rules mentioned in 1 can have at most $N_{sub}$ subexpressions.
3) Subexpressions are not allowed in a branch of an alternation, e.g. "ab(cd|ef|<gh>)ij" is not allowed, though "ab<cd|ef|gh>ij" is allowed.
4) No single NFA subexpression start state or subexpression end state can map to more than one DFA state. The compiler detects and rejects this case.
5) For a given DFA state, only one NFA state can be associated that contains start or end of subexpression information. The compiler detects and rejects this case.
6) No transitions from within a subexpression are allowed that transition to the start state of the same subexpression (e.g. "abc<(abc)*def>ijk").
7) Subexpression start state or end state cannot share a state with the terminal state of another rule (though a subexpression end state may also be the terminal state for that subexpression rule).

With these restrictions, hardware can be used to implement the regular expression, which unlike the NFA, can find subexpressions in a single data pass. While this hardware is similar to a DFA in that the next state is uniquely determined by the current state and an input character, it has additional components which allow subexpression handling. This hardware entity is referred to herein as an Extended DFA or EDFA.

This invention features a system for processing regular expressions containing one or more sub-expressions. Information regarding one or more regular expressions, each containing one or more sub-expressions, is stored. Data is compared to the stored information regarding expressions in only a single pass through the data. From the comparison, for any stored expression, the location within the data of the beginning and end of each sub-expression, and the end of the regular expression, are determined. From such determination, the presence within the data of any one or more stored regular expressions containing one or more sub-expressions is identified.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENT OF THE INVENTION

The invention comprises two major portions:
1. The software, referred to as a 'compiler', for converting a regular expression to tables and instructions for the EDFA hardware engine.
2. The EDFA hardware engine which carries out matching of the compiled regular expressions against a data stream.

Figure 1:
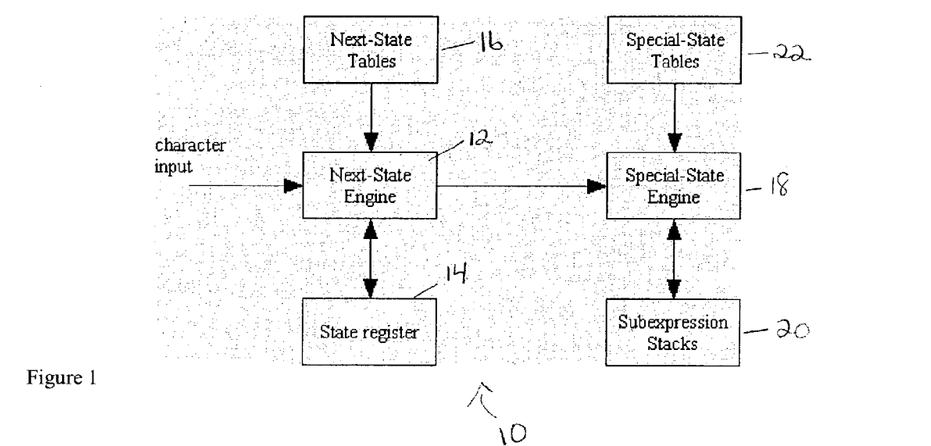
FIG. 1 is a top-level block diagram of the preferred embodiment of the invention.
Figure 2:
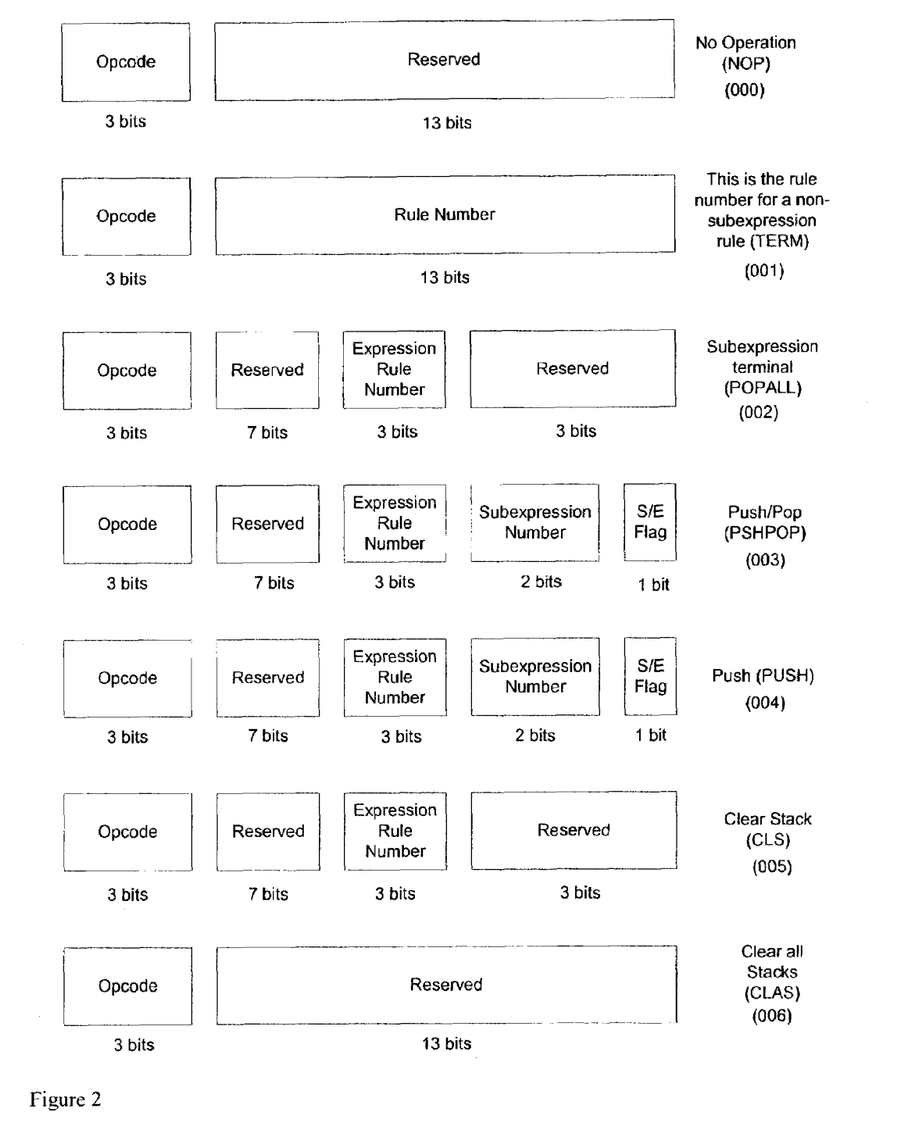
FIG. 2 is an example of the format of the special state memory instructions for the system of FIG. 1.

A block diagram of the preferred embodiment of the hardware engine 10 for the invention is shown in FIG. 1. The hardware starts in an initial state loaded into the state register 14. A character is fed into Next-state Engine 12, which determines the value of the machine next-state in a deterministic manner from the current state and the input character. This function may be implemented by using a set of next-state lookup tables 16, where there is one table per state. The current state is retrieved from state register 14, and lookup is performed using the current state and the input character. The result of this lookup is the next-state, which is stored into state register 16. The next-state lookup also returns a flag which indicates whether the 'special-state engine' should be used. The special state engine 18 is invoked when a terminal state has been reached, indicating a rule match, or for special processing associated with subexpressions. Special-state engine 18 has a block of memory that has one entry for each 'special-state'. Each entry is an instruction. The format of the instructions in an embodiment of the invention is shown in FIG. 2.

Regular expressions that do not contain subexpressions are matched by transitioning through a set of states in the next-state engine until a terminal state indicating a match is reached. This terminal state is signaled by a flag stored in the next-state tables 16, which indicates the special state engine 18 should be invoked. Special state engine 18 retrieves the instruction for the current state, examines the opcode and finds it set to a value meaning "a terminal state has been reached for a regular expression". The numeric value of the rule number corresponding to the terminal state is stored in this instruction and is returned by the hardware. In the specific embodiment illustrated in FIG. 2, 13 bits are allocated for the rule number, allowing 8192 possible rules to be recognized. Note that the number of bits used in FIG. 2 is for illustration purposes only, and the actual number of bits in any of the fields depends on details of a particular implementation.

In the case when subexpressions are part of a regular expression, the compiler has placed the proper instructions for each state involved in handling the subexpressions into special state memory 22. When the state indicating the start or end of a subexpression is encountered, a "Push" instruction is executed. The Push instruction contains the rule number with which it is associated, the number of the subexpression within that rule number, and a bit indicating whether this is the start or end of a particular sub-expression. The quantity pushed onto a stack 20 associated with a particular rule and subexpression is the byte offset of the character which triggered the subexpression start or end. Note that this is not the same operation as a conventional stack push, because the entry may be placed anywhere on the stack depending on the values of the subexpression number and start/end bit in the Push instruction operands. The 'push' thus is really a store instruction into an addressable memory.

Figure 3:
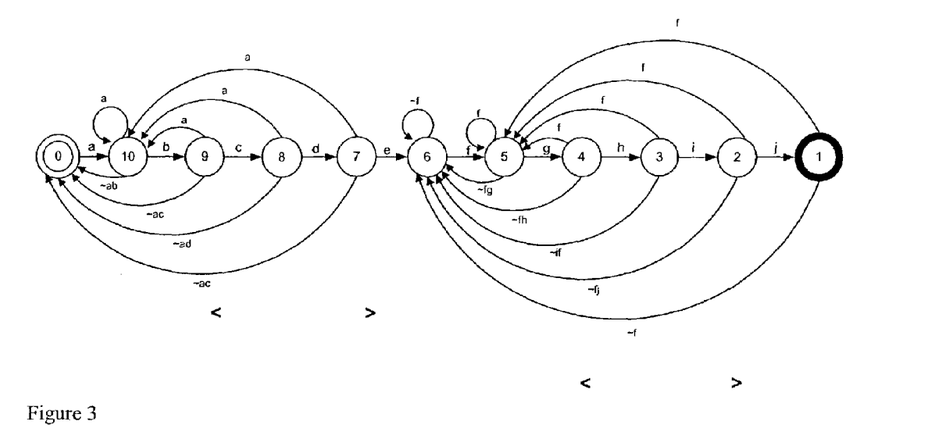
FIG. 3 is a representation of the EDFA for an example regular expression, useful in understanding the invention.

As an example which illustrates a 'push' that is not at the current top of the stack, consider matching the regular expression:

.*ab<cd>e.*fg<hi>j which has two subexpressions. FIG. 3 shows a representation of the EDFA for this regular expression. A left angle bracket '<' is used in the diagram to show where a 'push' operation occurs to place the start of the subexpression on the stack. Similarly, a right angle bracket '>' shows a push on the stack at the end of a subexpression. In this particular case, a left angle bracket is under state 9, indicating a 'push' of the byte position which opens the first subexpression, on a transition into state 9. The right angle bracket under state 7 indicates a 'push' of the byte position which closes the first subexpression on a transition into state 7. Note that these push operations allow state history information to be stored on the stack, which is not performed in a classic DFA.

Figure 4:
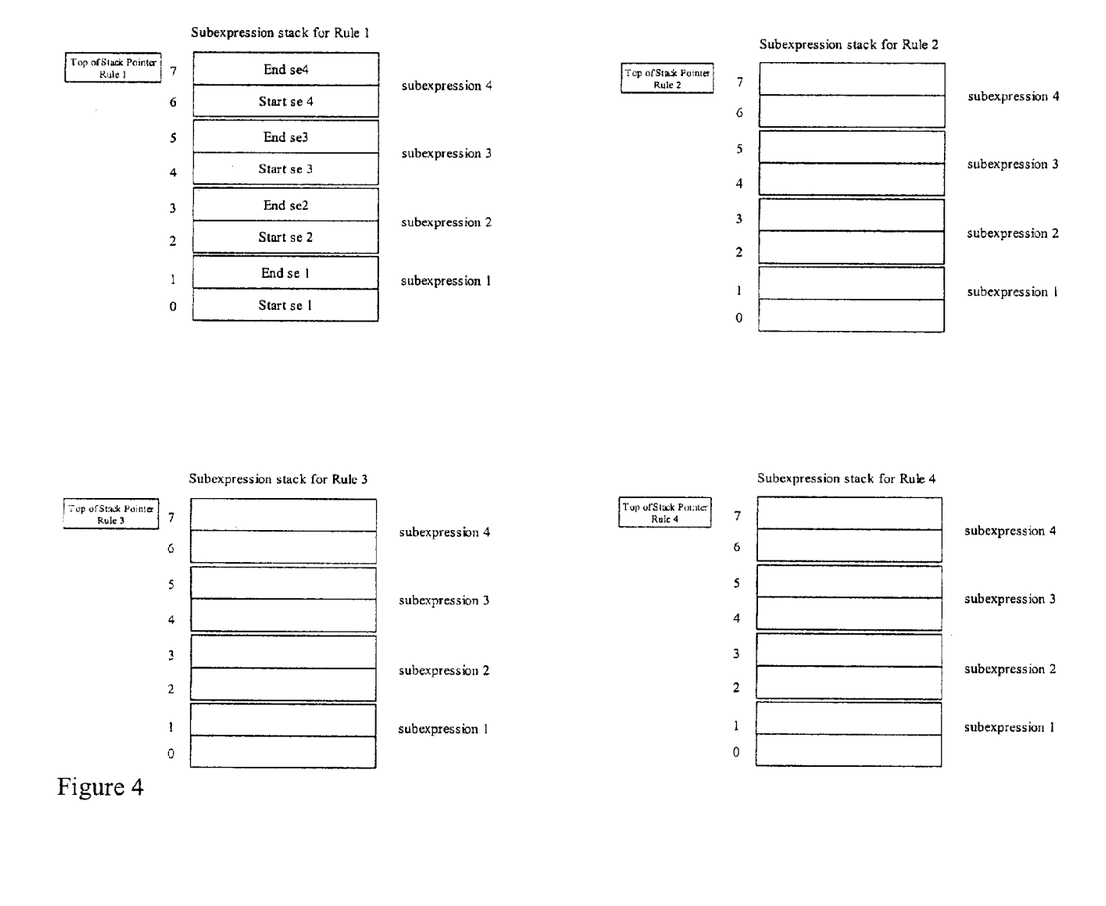
FIG. 4 is a simplified illustration of the subexpression stacks for an example of the invention.

A subexpression stack is available for each rule that is allowed to contain subexpressions. Thus if a maximum of four rules are allowed to contain subexpressions, then four stacks are available. The number of elements in each stack is twice the maximum number of subexpressions allowed in each rule; the offset for the start and end of each subexpression is stored on the stack, so a matched subexpression requires two entries. For example, if four rules may contain subexpressions and each such regular expression may have at most four subexpressions, then each stack contains eight elements and there are four stacks. As illustrated in FIG. 4, a separate "top of stack pointer" is used by each stack. This is required by the 'popall' instruction so that the correct number of start/end pairs can be supplied to the output. The "clear stack" instruction (see FIG. 2) is generated by the compiler when a state is reached from which a particular rule can never be terminated. Similarly, the "clear all stacks" instruction is used for states from which it is impossible to reach for any rules containing subexpressions. The "push/pop" instruction is used when the end of a subexpression is also the end of a regular expression. In this case, it is necessary to first push the current byte position on the stack to place the end of subexpression location on top of the stack. Since the end of regular expression has then been reached, it is then necessary to perform the "popall", which is performed at the terminal state of any successfully matched regular expression containing subexpressions.

Figure 5:
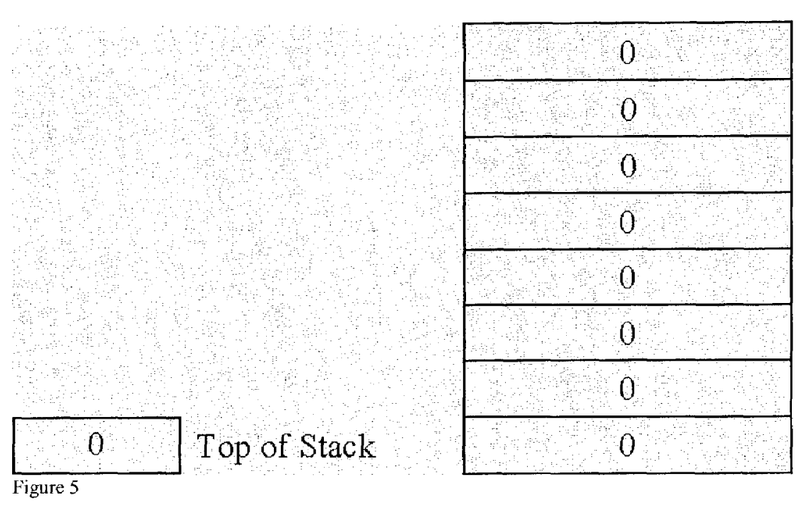
FIGS. 5-10 illustrate schematically the progressive sate of a stack for an example illustration of the invention.
Figure 6:
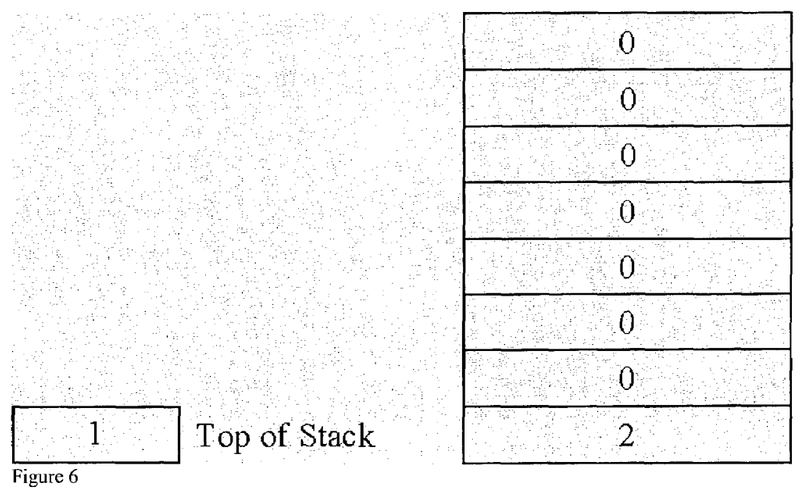
Figure 7:
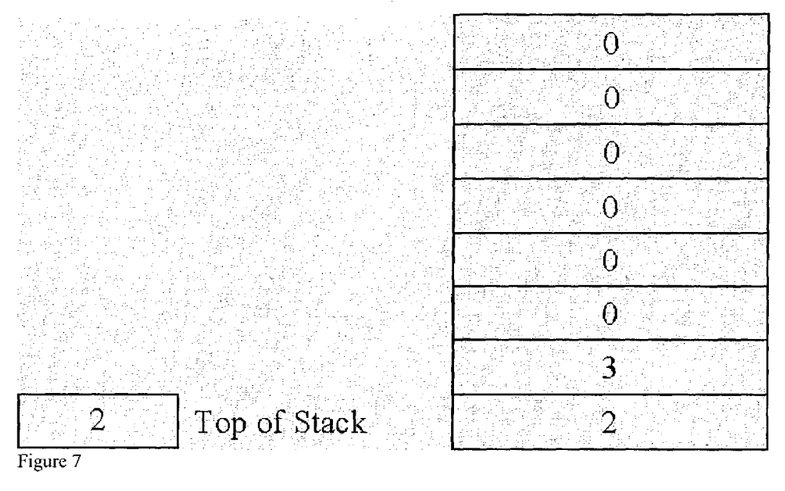
Figure 8:
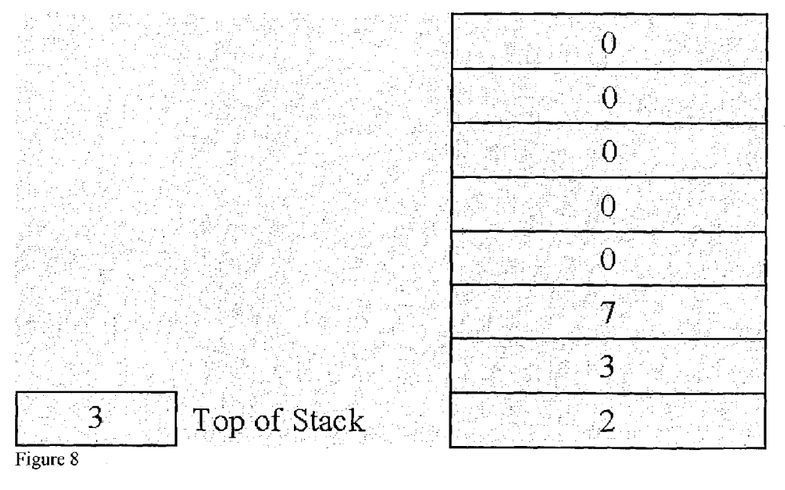
Figure 9:
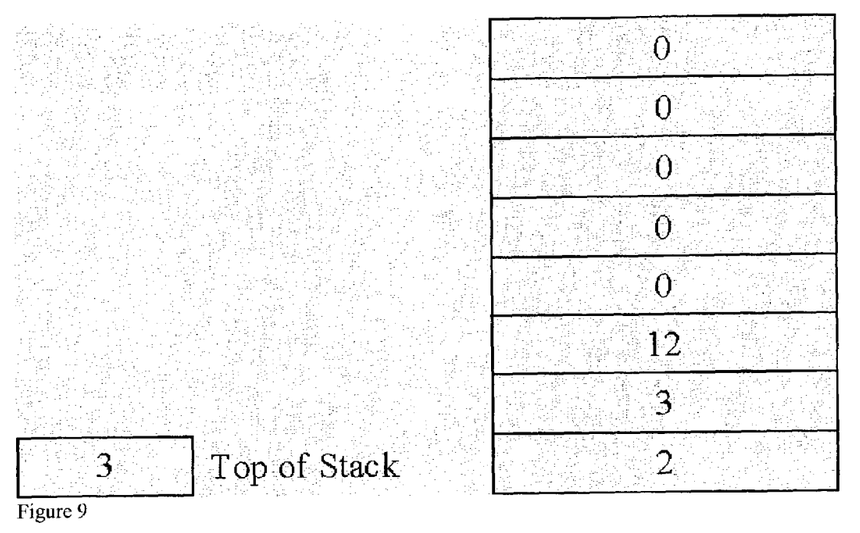

Consider an example where this regular expression is processed against a data stream containing the characters: abcdefghxefghij. The positions of characters in the input character string are numbered from zero. Thus, for example, the letter "c" is at location 2 in the data stream. Stack locations are numbered starting from zero, and the current top of the stack location is stored in a separate register. The state of the stack as processing proceeds for this example is illustrated in a series of FIGS. 5-10. Initially the empty stack is as shown in FIG. 5. After processing the first three characters (the last one being "c"), the state of the stack is shown in FIG. 6. The "2" pushed onto the stack indicates the byte offset of the character "c" that starts the first subexpression. The "top of stack" is the next element within the stack to be populated by a data location. After processing the next character, which is a "d", the first subexpression has been matched and its start/end locations have been pushed on the stack, as shown in FIG. 7. The stack now has the start of the first subexpression location, which is 2, and the end of that subexpression, which is 3. Then the next four letters "efgh" continue the match. The $8^{th}$ letter "h" opens matching of the second subexpression, and its location is pushed onto the stack as FIG. 8 illustrates. The next character in the data stream is "x", which does not match the second subexpression. Processing continues until the next letter "h" is encountered again matching the start of the second subexpression. When the letter "h" is processed next, its location is pushed into the same stack location as the previous "h", and the stack is in the state shown in FIG. 9. This illustrates an example of a 'push' that is really a store. Note that the EDFA in FIG. 3 has been constructed to automatically take care of this type of partial match that ends up writing in the stack at the appropriate location as it processes the input stream in sequential fashion.

Figure 10:
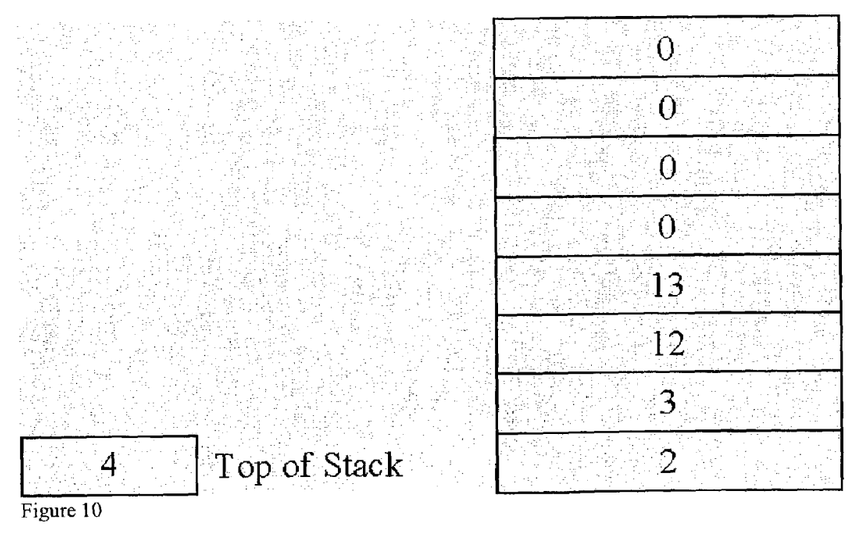

When the end of the second sub-expression is encountered, another "push" instruction is executed, which adds the byte offset of the character which closes the subexpression to the stack, and the stack as shown in FIG. 10. The final character in the input "j" is then processed, and the EDFA reaches a terminal state, having successfully matched the full regular expression including subexpressions.

When all the subexpressions in a particular regular expression have been matched and the terminal state for the rule has been reached, then the state at which this occurs, contains in the special state memory a "popall" instruction. This "popall" instruction empties the whole stack associated with the rule number it specifies (contained in the pop opcode), into the hardware output queue along with the rule number that has been matched and the offset to the final byte of the rule. It then resets the top of stack pointer for that rule to the bottom of the stack.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A computer useable information storage medium storing computer readable program code for causing a computer to perform the steps of:
    storing information regarding one or more regular expressions, each containing one or more sub-expressions;
    comparing data to the stored information regarding the regular expressions and the sub-expressions in only a single pass through the data;
    determining from the comparison the location within the data of the beginning and end of each sub-expression, and the end of the regular expression; storing the location; and
    identifying from such determination the presence within the data of any one or more stored regular expressions containing one or more sub-expressions.

2. The computer useable information storage medium of claim 1, wherein the storing information regarding regular expressions comprises converting a regular expression to tables stored in memory.

3. The computer useable information storage medium of claim 2, wherein the determining step comprises saving, upon the start or end of a sub-expression, an identification of a rule with which the sub-expression is associated, an identification of the sub-expression within the rule, and an identification of whether it is the start or end of a sub-expression.

4. The computer useable information storage medium of claim 3, wherein the saving comprising storing the identifications in an addressable memory.

5. The computer useable information storage medium of claim 4, further comprising keeping track of the next location within the addressable memory for storing an identification.

6. The computer useable information storage medium of claim 3, wherein the means for saving step comprising storing the byte offset of the data which comprises the start or end of a sub-expression.

7. The computer useable information storage medium of claim 2, wherein there is one table for each regular expression containing one or more sub-expressions.

8. The computer useable information storage medium of claim 7, wherein the table of each regular expression containing one or more sub-expressions comprising a quantity of elements equal to at least twice the maximum number of sub-expressions in the rule, so that the start and end of each sub-expression can be separately stored.

9. A method for processing regular expression containing one or more sub-expressions, comprising:
    storing information regarding one or more regular expressions, each containing one or more sub-expressions, including converting a regular expression to tables stored in memory, wherein there is one table for each regular expression containing one or more sub-expressions, and wherein such tables each comprise a quantity of elements equal to at least twice the maximum number of sub-expressions in the rule, so that the start and end of each sub-expression can be separately stored in a table;
    comparing data to the stored information regarding expressions in only a single pass through the data;
    determining from the comparison, for any stored expression, the location within the data of the beginning and end of each sub-expression, and the end of the regular expression, wherein the determining step includes saving upon the start or end of a sub-expression, an identification of a rule with which the sub-expression is associated, an identification of the sub-expression within the rule, and an identification of whether it is the start or end of a sub-expression, and wherein the saving comprises means for storing the byte offset of the data which comprises the start or end of a sub-expression in an addressable memory;
    identifying from such determination the presence within the data of any one or more stored regular expressions containing one or more sub-expressions; and
    keeping track of the next location within the addressable memory for storing an identification.

10. A system for processing regular expressing containing one or more sub-expressions using a deterministic finite state automation comprising:
    means for storing information regarding one or more regular expressions, each containing one or more sub-expressions;
    means for comparing data to the stored information regarding the regular expressions and the sub-expressions in only a single pass through the data;
    means for determining from the comparison the location within the data of the beginning and end of each sub-expression, and the end of the regular expression storing location; and
    means for identifying from such determination the presence within the data of any one or more stored regular expressions containing one or more sub-expressions.

* * * * *